United States Patent

Sanda et al.

[11] Patent Number: 5,772,495
[45] Date of Patent: Jun. 30, 1998

[54] METHOD AND APPARATUS FOR PRODUCING PHOTO FILMSTRIP

[75] Inventors: Akihiro Sanda; Fujio Kuwabara; Naoki Sakai, all of Kanagawa, Japan

[73] Assignee: Fuji Photo Film Co., Ltd., Kanagawa, Japan

[21] Appl. No.: 713,487

[22] Filed: Sep. 13, 1996

[30] Foreign Application Priority Data

Sep. 22, 1995 [JP] Japan .................................. 7-244772

[51] Int. Cl.⁶ .............................. B24B 7/12; B24B 9/00
[52] U.S. Cl. ............................... 451/69; 15/100; 15/308; 15/309.1; 29/564.6; 53/520; 83/948; 242/526.3; 451/70; 451/184; 451/261; 451/907
[58] Field of Search ..................... 29/564.6, 782, 29/819, 820; 15/88.3, 100, 301, 303, 306.1, 308, 309.1, 363, 374; 53/118, 520; 83/23, 948, 949; 242/348, 526, 526.3; 451/65, 67, 69, 70, 167, 176, 183, 184, 261, 907

[56] References Cited

U.S. PATENT DOCUMENTS

| | | | |
|---|---|---|---|
| 1,660,350 | 2/1928 | Owen | 451/261 X |
| 2,696,729 | 12/1954 | Vander Heyden | 451/261 X |
| 3,468,071 | 9/1969 | Woodward | 451/261 |
| 3,945,077 | 3/1976 | Elsbery et al. | 15/100 X |
| 3,986,301 | 10/1976 | Lough et al. | 451/261 |
| 4,574,563 | 3/1986 | Shimizu | 53/430 |
| 4,709,157 | 11/1987 | Shimizu et al. | 250/572 |
| 4,832,275 | 5/1989 | Robertson | 242/71.1 |
| 4,834,306 | 5/1989 | Robertson et al. | 242/71.1 |
| 5,271,577 | 12/1993 | Takahashi et al. | 242/71.16 |
| 5,359,750 | 11/1994 | Le Vantine | 15/319 |
| 5,407,146 | 4/1995 | Takahashi et al. | 242/348 |
| 5,435,500 | 7/1995 | Shibata | 242/348.4 |
| 5,479,691 | 1/1996 | Shimizu et al. | 29/430 |

FOREIGN PATENT DOCUMENTS

| | | |
|---|---|---|
| B10183862 | 4/1990 | European Pat. Off. . |
| A10685758 | 12/1995 | European Pat. Off. . |
| 62-86530 | 4/1987 | Japan . |
| 63-133320 | 6/1988 | Japan . |
| 1292638 | 11/1989 | Japan . |
| 1399087 | 5/1988 | U.S.S.R. .................... 451/183 |

Primary Examiner—Timothy V. Eley
Attorney, Agent, or Firm—Sughrue, Mion, Zinn, Macpeak & Seas, PLLC

[57] ABSTRACT

A photo filmstrip (14) of a regular length (L) is produced from photo film web (45) having a predetermined width (W). The photo filmstrip and the photo film web have a back surface, an emulsion surface, a pair of lateral edge faces (45a), and four corner edges (45b, 45c) defined between the back surface, the emulsion surface, and the lateral edge faces. At least one of the lateral edge faces and at least one of the corner edges of the photo film web are abraded while the photo film web is conveyed. Photo film dust, created in the abrasion is eliminated from the photo film web. Perforations (34) are formed in the photo film web. The photo film web is cut by the regular length into the photo filmstrip, which is wound into a cassette shell.

13 Claims, 8 Drawing Sheets

METHOD AND APPARATUS FOR PRODUCING PHOTO FILMSTRIP

BACKGROUND OF THE INVENTION

1. Field of the Invention

The present invention relates to a method and apparatus for producing a photo filmstrip. More particularly, the present invention relates to a method and apparatus for producing a photo filmstrip, in which the roughness in the lateral edges of the photo film caused by slitting the web, and the ensuing minute dust caused by these rough edges, is prevented from affecting the quality of the photo film.

2. Description Related to the Prior Art

U.S. Pat. Nos. 4,832,275, 4,834,306, 5,271,577 (corresponding to JP-A 3-37645), 5,407,146 (corresponding to JP-A 3-37645) and 5,435,500 disclose a photo film cassette of an improved type with which a camera can be loaded easily, which can be handled efficiently in a photo laboratory, and which can be treated manually with ease by operators. The photo film cassette is characterized in that rotation of a spool core causes a leader of a photo filmstrip to advance to the outside of a cassette shell. To this end, two flexible disks having a shallow cup shape are mounted on ends of the spool core to squeeze a roll of the photo filmstrip, for transmitting the rotation of the spool core to the photo filmstrip. Each periphery of the disks covers one edge of the roll of the photo filmstrip, to prevent the roll from being loosened in the cassette shell.

The disks are pressed and spread in a width direction of the photo filmstrip by lateral edges of the photo filmstrip, to release the photo filmstrip from being covered. For easy deformation of the disks, the disks are thinly formed from plastic material having resiliency.

To produce the photo filmstrip contained in the cassette shell or of the conventional 135 type, web of a plastic material having a large width and a continuous length is initially prepared, and coated with emulsion, before being slitted into photo film web (continuous photo film) by the width of the photo filmstrip. The use of the web is to regularize thickness of the emulsion on a photo film support with high efficiency. The photo film web is perforated to form a train of perforations, and cut into regular length into the photo filmstrip, which is wound into the cassette shell.

The photo filmstrip formed of the web into slitting by the regular width has lateral edges which are considerably rough with minute recesses, projections, cracks and chips. There are problems in that the lateral edges are rubbed to create minute photo film dust, for example, when the photo filmstrip is contacted on the disks inside the cassette shell, or when the photo filmstrip is wound in the camera or a photo film processor or about a roller.

The minute dust remains unremoved in the cassette shell, and is deposited on the photo filmstrip or enters the camera or the like. The photo filmstrip with the minute dust deposited thereon cannot be exposed properly for taking a photograph. Or it is likely that the photo filmstrip is frictionally scratched with the minute dust in the course of the use or traveling of the photo filmstrip. The camera, the photo film processor or the like used with the photo filmstrip requires frequent inspection and maintenance, as the minute dust is constantly accumulated and should be cleared.

There are various suggestions of subjecting the lateral edges of the photo filmstrip to a smoothing treatment. JP-A 62-86530 and commonly assigned JP-A 1-292638 disclose heating, melting and smoothing of the lateral edges of resin film for the prevention of occurrence of the minute dust. JP-A 63-133320 discloses the application of a coating of polishing material and lubricant agent to the lateral edges after the slitting. JP-B 4-4119 discloses the blow and suction of air to a sheet or film for eliminating the minute dust. However none of heating, polishing material and lubricant agent method can be used for the photo filmstrip, because of the considerable effect on to the emulsion of the photo filmstrip. The blow and suction of air in JP-B 4-4119 is still ineffective, because the minute projections and chips remain projecting from the photo filmstrip and cannot be removed.

SUMMARY OF THE INVENTION

In view of the foregoing problems, an object of the present invention is to provide a method and apparatus for producing a photo filmstrip, of which the roughness of the lateral edges of the photo filmstrip is smoothed for avoiding the occurrence of minute photo film dust.

In order to achieve the above and other objects and advantages of this invention, a photo filmstrip of a regular length is produced from a photo film web having a predetermined width, the photo filmstrip and the photo film web having a back surface, an emulsion surface, a pair of lateral edge faces, and four corner edges defined between the back surface, the emulsion surface, and the lateral edge faces. At least one of the lateral edge faces and at least one of the corner edges of the photo film web are abraded while the photo film web is conveyed. Photo film dust is eliminated from the photo film web, the dust having been created in the abrading step. Perforations are formed in the photo film web. The photo film web is cut by a regular length into the photo filmstrip, in order to wind the photo filmstrip into a cassette shell.

In accordance with the present invention, roughness of lateral edges of the photo filmstrip is smoothed for avoiding the occurrence of minute photo film dust.

BRIEF DESCRIPTION OF THE DRAWINGS

The above objects and advantages of the present invention will become more apparent from the following detailed description when read in connection with the accompanying drawings, in which.

DETAILED DESCRIPTION OF THE PREFERRED EMBODIMENT(S) OF THE PRESENT INVENTION

Figure 1:
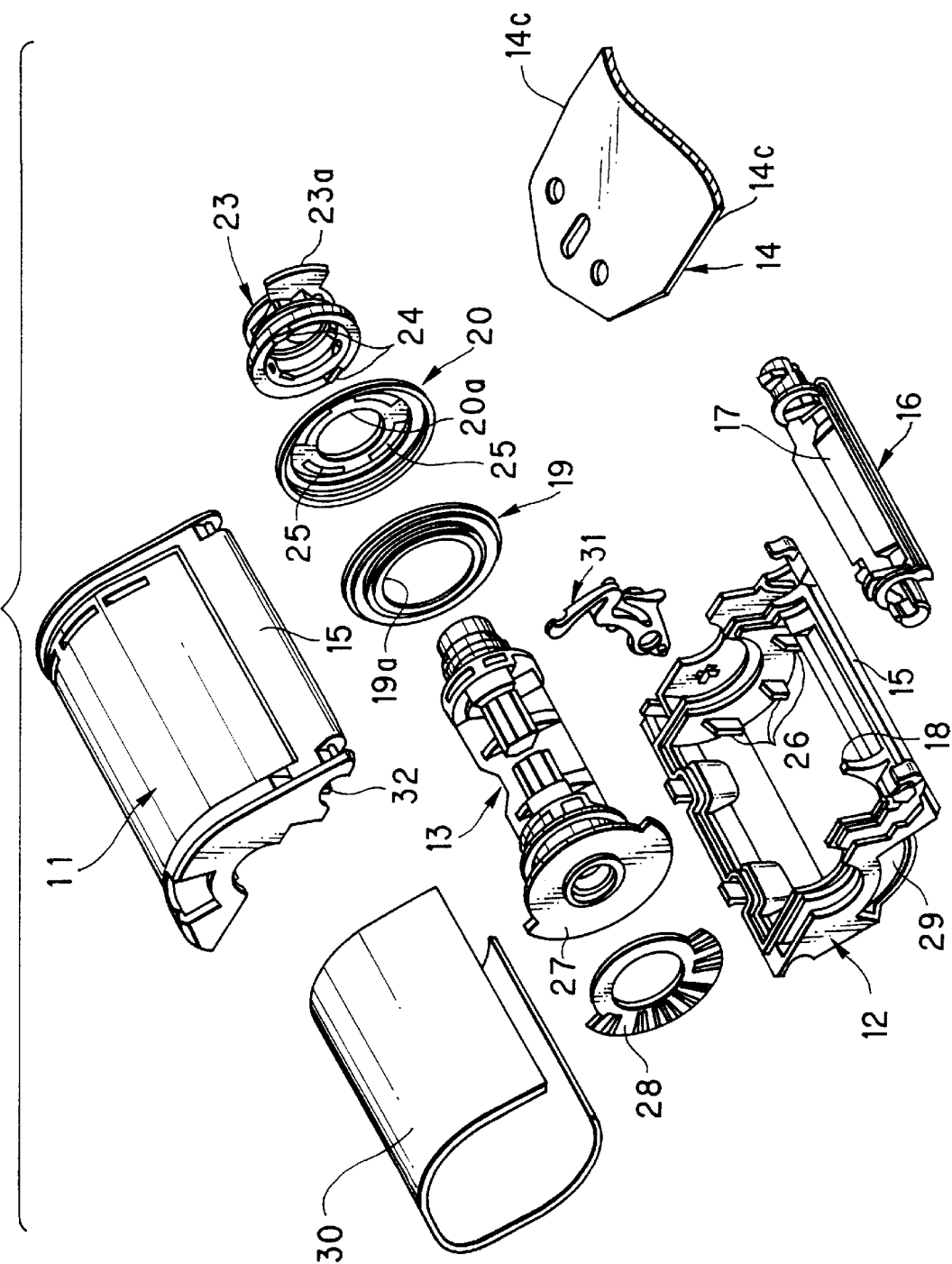
FIG. 1 is an exploded perspective illustrating a photo film cassette.
Figure 2:
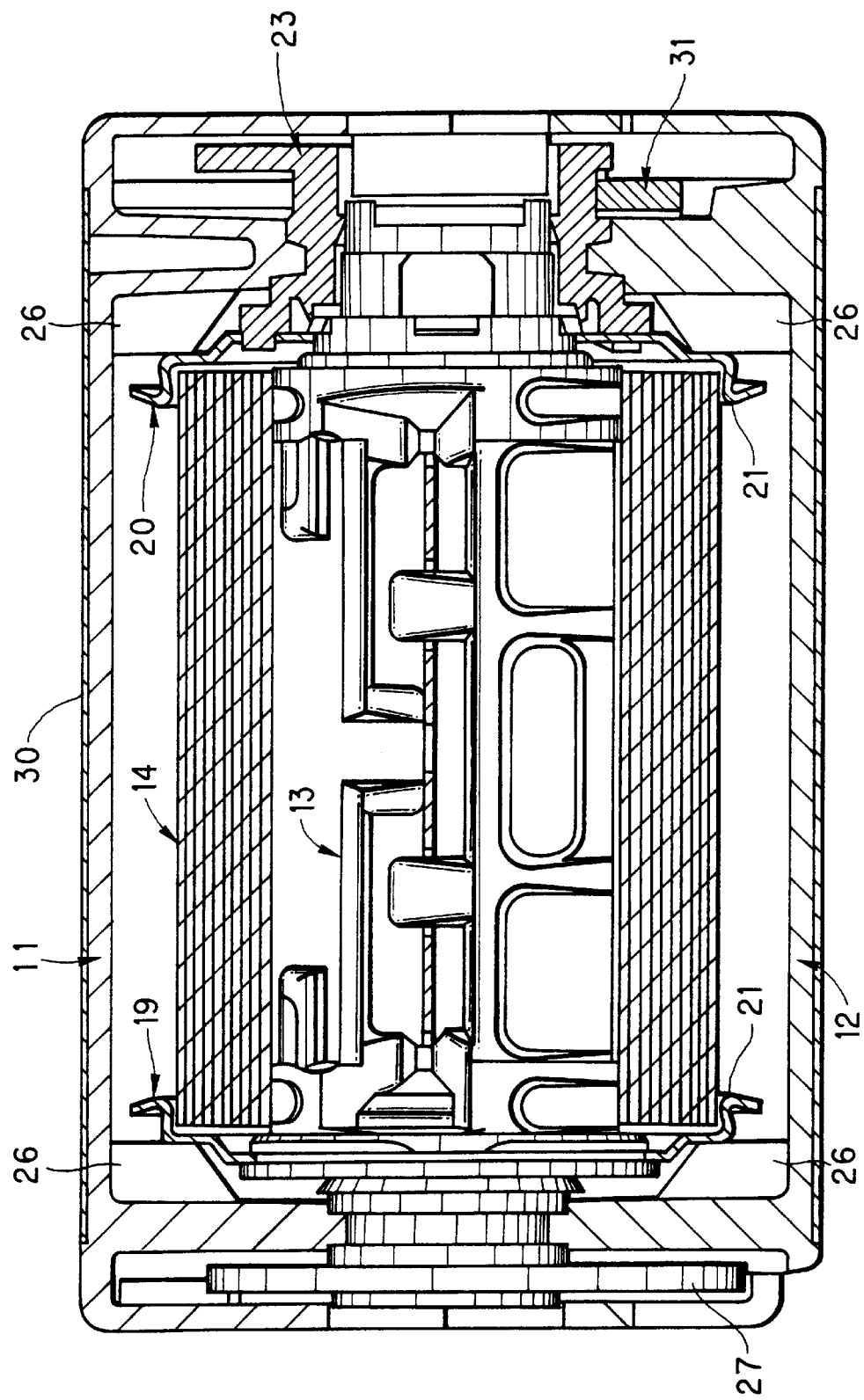
FIG. 2 is a vertical section illustrating the photo film cassette.

In FIGS. 1 and 2, a cassette shell 10 includes upper and lower shell halves 11 and 12 respectively formed from plastic. A spool core 13 is contained in the cassette shell 10 in rotatable fashion, and has a photo filmstrip 14 wound in a roll form.

Figure 3:
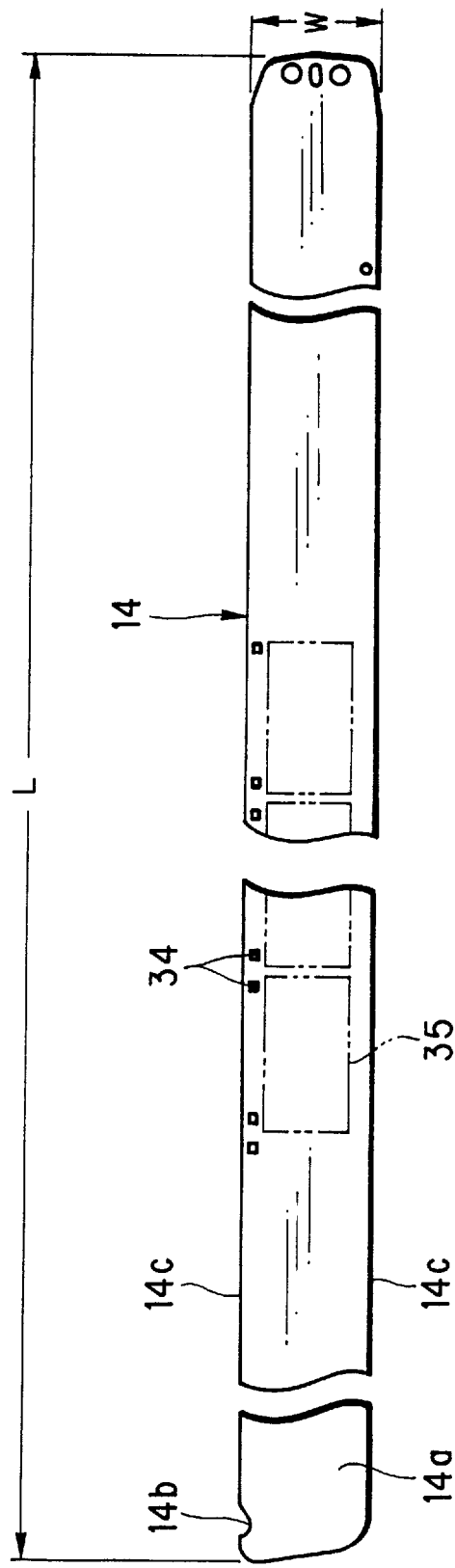
FIG. 3 is a plan, view partially cutaway, illustrating the photo filmstrip.

The photo filmstrip 14, as illustrated in FIG. 3, has a length L of 500–1,700 mm, and has a width of 24 mm. The length L differs according to a maximum photographable number of exposures of the photo filmstrip 14. Perforations 34 are regularly formed along one edge of the photo filmstrip 14 for the purpose of positioning of the photo filmstrip 14. Every two of the perforations 34 are combined together, and located over one of frames 35. There is a notch 14b formed in a leader 14a of the photo filmstrip 14, for the purpose of facilitating advancement of the leader 14a out of the cassette shell 10.

The shell halves 11 and 12 respectively have a semi-cylindrical shape. There is a photo film port 15 defined between tongues extended from the shell halves 11 and 12. When the shell halves 11 and 12 are fitted together, a photo film port shutter 16 is rotatably contained in the photo film port 15. A photo film passageway 17 is formed as a gap in the photo film port shutter 16. When the photo film port shutter 16 rotates to an open position, the photo film passageway 17 communicates from the inside of the photo film port 15 to the outside, to allow the photo filmstrip 14 to pass. When the photo film port shutter 16 rotates to a closed position, the photo film port 15 is completely closed, to shield the inside of the cassette shell 10 from ambient light.

A separator claw 18 is formed in the position inward from the photo film port 15 of the lower shell half 12. The separator claw 18, when the spool core 13 is rotated, abuts on a leader of the photo filmstrip 14, separates the leader 14a from the roll, and guides it to the photo film passageway 17.

Disks 19 and 20 have respective axial holes 19a and 20a. The spool core 13 is inserted through the axial holes 19a and 20a to secure the disks 19 and 20 to the spool core 13 in rotatable fashion in their positions. There are formed ring-like lips 21 on the periphery of the disks 19 and 20 to project toward each other. The ring-like lips 21 partially cover edges of the leader 14a of the photo filmstrip 14.

When a barrel member 23 is fitted on the spool core 13, retaining holes 25 in the disk 20 are retainable on the clutch claws 24. In rotation of the spool core 13 in the unwinding direction, the retaining holes 25 are retained by the clutch claws 24 to transmit rotation to the disk 20. When the spool core 13 is rotated in the winding direction, the retaining holes 25 are not retained by the clutch claws 24, so that the disk 20 is rotationally free from the spool core 13. On the other hand, the disk 19 is always rotatable about the spool core 13. There is a sector plate 23a formed with the barrel member 23. A position of the sector plate 23a is visible through one of indicator windows. A used status of the photo film cassette is indicated through the one window.

Ridges 26 are projected from an inside of the shell halves 11 and 12, and prevent the disks 19 and 20 from spreading. A sector plate 27 is fixed on the spool core 13, and has a data bar code sticker 28 attached thereto. There is a bar code printed on the data bar code sticker 28 and arranged radially. The bar code is photoelectrically detected through a window 29 in the cassette shell 10 when the spool core 13 is rotated. It is possible on the bar code to read information on the type of the photo filmstrip 14 contained in the cassette shell 10 and information on the number of frames of the photo filmstrip 14. A sticker 30 attached to the cassette shell 10 indicates of the photo film type information and an identifying information on the cassette. It is also possible to provide the sector plate 27 directly with a bar code by hot stamping without using the data bar code sticker 28.

A spool lock 31 blocks rotation of the spool core 13 while the photo film port shutter 16 is in the closed position. When the photo film port shutter 16 is rotated to the open position, the spool core 13 is unblocked. Reference numeral 32 designates a lock pawl formed integrally with the upper shell half 11. The photo film port shutter 16 is locked by the lock pawl 32 when rotated to the closed position. A camera or a display device adapted with the photo film cassette includes an opener mechanism, which unlocks the lock pawl 32 to open the photo film port shutter 16 when the camera or display device is loaded with the photo film cassette. Note that it is possible to form a photo film passageway in the photo film port 15, and to attach plush or light-trap fabric instead of the use of the photo film port shutter 16, for the purpose of shielding ambient light from the cassette shell 10.

As illustrated in FIG. 2, when the photo filmstrip 14 is completely contained in the cassette shell 10, the leader 14a of the photo filmstrip 14 is partially covered in the ring-like lips 21 of the disks 19 and 20, and prevented from being loosened about the spool core 13. When the spool core 13 is rotated in the unwinding direction of the photo filmstrip 14, the photo filmstrip 14 rotates integrally with the spool core 13.

The ridges 26 inside the shell halves 11 and 12 regulate movable ranges of the disks 19 and 20. In the position inward from the photo film port 15, an interval between confronted two of the ridges 26 is enlarged, locally to release the disks 19 and 20 to be spread. After the leader 14a of the photo filmstrip 14 is separated by the separator claw 18 toward the photo film passageway 17, the disks 19 and 20 are spread outwards by lateral edges 14c of the photo filmstrip 14. The photo filmstrip 14 is advanced from between the ring-like lips 21 in curled fashion like an archway.

When a camera is loaded with the photo film cassette, the camera releases the photo film port shutter 16 from the retention of the lock pawl 32, and rotates the photo film port shutter 16 to the open position. Then the spool core 13 is rotated in the unwinding direction, to start advancing the photo filmstrip 14. As the ring-like lips 21 of the disks 19 and 20 are avoiding loosening the photo filmstrip 14, the roll of the photo filmstrip 14 rotates integrally with the spool core 13. The leader 14a of the photo filmstrip 14 is separated by the separator claw 18, and directed to the photo film passageway 17.

While the leader 14a of the photo filmstrip 14 is passed through the photo film passageway 17, the lateral edges 14c of the photo filmstrip 14 spread the ring-like lips 21 outwards, so that the photo filmstrip 14 is released from being covered in the ring-like lips 21 in the position inward from the photo film passageway 17. The disk 20 is forcibly rotated in the unwinding direction in engagement of the clutch claws 24 with the retaining holes 25, and thus raises a force to advance the photo filmstrip 14. This being so, rotation of the spool core 13 causes the photo filmstrip 14 to advance to the outside of the cassette shell 10.

In the photo film rewinding, the spool core 13 is rotated in reverse. As a trailer of the photo filmstrip 14 is retained on the spool core 13, the photo filmstrip 14 is wound back into the cassette shell 10 by the rotation of the spool core 13.

In a position inward from the photo film passageway 17, the disks 19 and 20 are spread, between which the photo filmstrip 14 is taken up and wound about the spool core 13. The lateral edges 14c of the photo filmstrip 14 are always in contact with the ring-like lips 21 of the disks 19 and 20 except when all the photo filmstrip 14 is contained in the cassette shell 10. The photo filmstrip 14 according to the present invention is constituted of support material of polyethylene naphthalate (hereinafter referred to as PEN).

The cassette shell 10 is a small type as compared with a 135 type widely used. The support material can be finished by thermal treatment at the temperature which is at lowest 50 degrees Centigrade and at highest the glass transition temperature. The support material after such thermal treatment has a stiff tendency and is not curled irrecoverably. This is a good feature when the support material is contained in a small diameter cassette shell 10.

The polyester film for the support material should have a glass transition temperature between 90 and 20 degrees Centigrade. The effect of thermal treatment would be lost in on the support material when it is subjected to heat beyond the glass transition temperature. Therefore polyester having a somewhat high glass transition temperature is preferable. A desirable polyester has a glass transition temperature of at least 90 degrees, taking into consideration the temperature of 80 degrees as a hottest practical environment, e.g. a situation in an automobile under daylight in midsummer.

There is no general-purpose polyester which has a glass transition temperature beyond 200 degrees and is transparent enough for use as photo filmstrip. It follows that polymer film for the photo filmstrip 14 to be used with the present invention can have a glass transition temperature between 90 and 200 degrees.

Among polymers, polyester is preferable because thermal treatment below the glass transition temperature is effective for obtaining support material having a stiff tendency and little irrecoverable curling. Among polyester films, the polyethylene naphthalate (PEN) produced from naphthalene dicarboxylic acid and ethylene glycol is preferable, because it is advantageous has good balance in mechanical intensity and having little irrecoverable curling tendencies. In particular, polyethylene-2,6-naphthalene dicarboxilate is preferable.

To use the PEN for the photo filmstrip 14, the support material can preferably have a thickness of at least 40 $\mu$m. The support material is thermally treated and then coated with photosensitive emulsion layers. Should the support material have a thickness of 40 $\mu$m or less, the support material may not resist the stress caused in shrinkage while drying after coating of the emulsion layers. Such extremely thin support material would be bent, folded and ruptured in course of conveyance e.g. in a photographic printer.

The glass transition temperature (Tg), herein referred to, is defined as: the arithmetic average temperature between the temperature at which a sample film starts being shifted from a base line and the temperature at which the sample film returns to a new base line, measured by a differential thermal analyzer (DSC), while 10 mg of the sample film is heated at a ratio of 20° C./min. in a gas stream of helium and nitrogen. If a peak of heat absorption appears at the glass transition temperature as defined such, the glass transition temperature is regarded as a maximum temperature of the peak of heat absorption.

Diols and dicarboxilic acids for producing polyester having a glass transition temperature between 90 and 200 degrees are now referred to.

Applicable examples of dicarboxylic acid are: naphthalene dicarboxilic acid, terephthalic acid, isophthalic acid, phthalic acid, phthalic anhydride, succinic acid, glutaric acid, adipic acid, sebacic acid, succinic anhydride, maleic acid, fumaric acid, maleic anhydride, itaconic acid, citraconic anhydride, tetrahydrophthalic anhydride, diphenylene-p,p'-dicarxilic acid, tetrachlorophthalic anhydride, 3,6-endo-methylenetetrahydrophthalic anhydride, and 1,4-cyclohexane dicarboxilic acid.

Applicable examples of diol are: ethylene glycol, 1,3-propanediol, 1,2-propanediol, 1,4-butanediol, 1,5-pentanediol, 1,6-hexanediol, 1,7-heptanediol, 1,8-octanediol, 1,10-decanediol, 1,12-dodecanediol, 1,4-cyclohexanediol, 1,4cyclohexanedimethanol, 1,3-cyclohexanediol, 1,1-cyclohexanedimethanol, catechol, resorcin, hydroquinone, 1,4-benzenedimethanol, and bisphenol A.

Preferred examples of polyester in use in the present invention are:

PEN: [2,6-naphthalene dicarboxilic acid (NDCA)/ ethylene glycol (EG) (100/100)] of which Tg=119° C.;

PCT: [terephthalic acid (TPA)/cyclohexanedimethanol (CHDM) (100/100)] of which Tg=93° C.; and PAr: [TPA/bisphenol A (BPA) (100/100)] of which Tg=192° C.

Among the above-described materials, the PEN has a high modulus in flexure as a mechanical strength. The PEN film being 80 $\mu$m thick has strength as much as a film being 122 $\mu$m thick and formed of triacetyl cellulose (TAC), which is widely used for a support of photo film. If the PEN film is 85 $\mu$m thick, it has sufficient strength under a high humidity of 85% RH.

Figure 4:
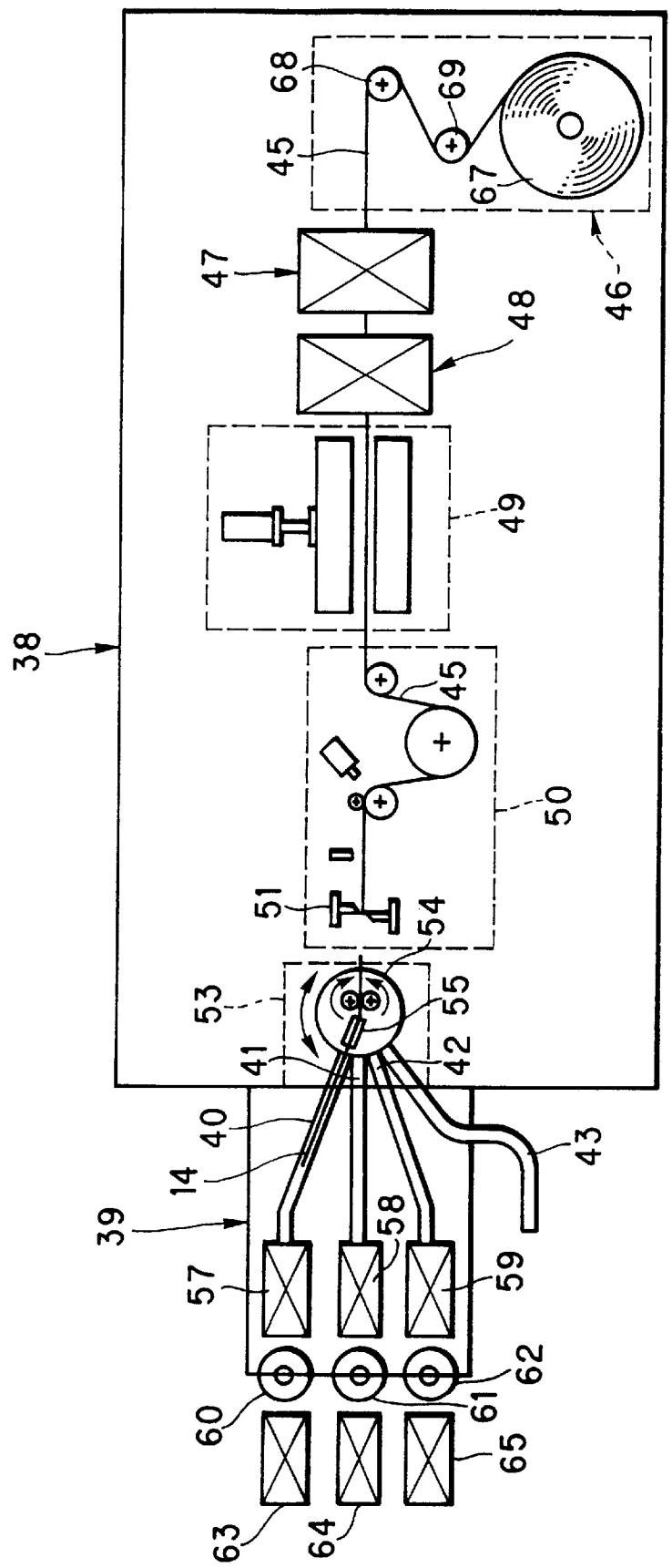
FIG. 4 is an explanatory view illustrating an apparatus for producing the photo filmstrip.

FIG. 4 illustrates an apparatus for producing a photo film cassette, which is constituted by a photo filmstrip producing compartment 38 and a winding compartment 39. The strip producing compartment 38 contains an apparatus for producing the photo filmstrip 14. The winding compartment 39 operates to wind the photo filmstrip 14 into the cassette shell 10. The strip producing compartment 38 and the winding compartment 39 are darkened compartments for protecting the photo filmstrip 14 from ambient light. Transport paths 40, 41, 42 and 43 communicate from the strip producing compartment 38 to the winding compartment 39, and guides conveyance of the photo filmstrip 14. Shutters are respectively disposed in the transport paths 40–43, to be closed to avoid entry of ambient light for the purpose of disassembly in periodical inspection of the apparatus.

In the strip producing compartment 38 are arranged a photo film web supplier 46, a photo film abrader unit 47, a cleaning apparatus (dust eliminator) 48, a perforator 49 and a cutter 50. The photo film web supplier 46 supplies photo film web (continuous photo film) 45 having a width of the photo filmstrip 14, and conveys it toward the winding compartment 39. The photo film abrader unit 47 effects abrasion of lateral edge faces of the photo film web 45, and of corner edges defined beside the lateral edge faces. The cleaning apparatus 48 eliminates dust which has been created from the photo film web 45 and stuck to the photo film web 45. The perforator 49 forms the perforations 34 in the photo film web 45. The cutter 50 includes a cutting mechanism 51, which cuts the photo film web 45 into the photo filmstrip 14 by the predetermined length, and also trims the leader 14a and the trailer of the photo filmstrip 14.

A delivery unit 53 is disposed downstream from the cutter 50. The photo filmstrip 14 is conveyed through the delivery unit 53 after being cut off from the photo film web 45 in the cutter 50 in an orientation of advancing the trailer of the photo filmstrip 14. The delivery unit 53 consists of a rotary disk 54 and a guide device 55. The rotary disk 54 is rotatable between plural angular positions as predetermined. The guide device 55 includes two parallel plates secured to the rotary disk 54. The rotary disk 54 is stopped to direct the guide device 55 to a selected one of the transport paths 40–43, to advance the photo filmstrip 14 into the selected path. Only the transport path 43 is used for ejecting the photo filmstrip 14 being detected as unacceptable.

There are three loaders 57, 58 and 59 which are disposed in the winding compartment 39 and connected respectively to the transport paths 40–42. Details of the loaders 57–59 are disclosed in EP-A 0 685 758. The loaders 57–59 are associated with light-shielded transfer rotors 60, 61 and 62, which are rotatable and also keep the winding compartment 39 shielded from ambient light. Supply/exit units 63–65 respectively supply the loaders 57–59 with the cassette shell 10 before having the photo filmstrip 14. The cassette shell 10 at this time has the photo film port shutter 16 rotated to open the passageway 17, through which the trailer is inserted and retained on the spool core 13. Rotation of the spool core 13 winds all the photo filmstrip 14 into the cassette shell 10, before the photo film port shutter 16 is rotated to close the passageway 17. The photo filmstrip 14 after including the cassette shell 10 is transferred by the transfer rotors 60–62 to the supply/exit units 63–65, through which the photo filmstrip 14 is sent to stations for inspection and packaging.

The photo film web supplier 46 in the strip producing compartment 38 has a roll 67 in which the photo film web 45 is wound, and includes a conveyor roller 68 for conveying the photo film web 45, and a dancer roller 69 for applying tension to the photo film web 45.

Figure 5:
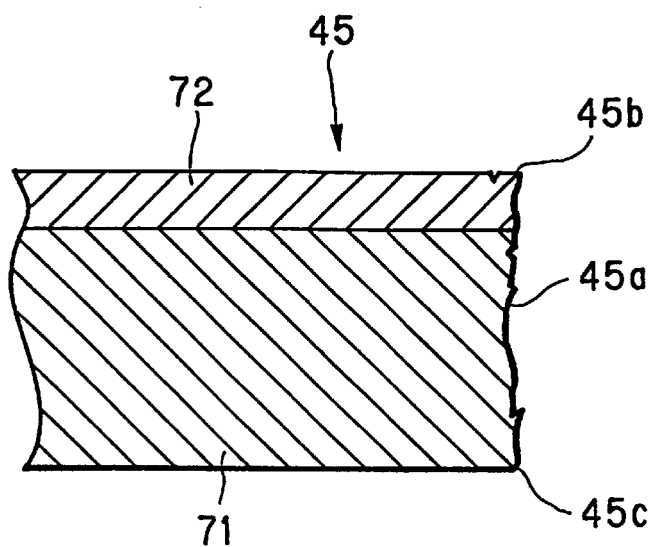
FIG. 5 is a cross section illustrating the photo film web before abrasion.

In FIG. 5, the photo film web 45 consists of a support 71 formed from the PEN, and an emulsion layer 72 overlaid on the photo film support 71. For the photo film web 45, as suggested in U.S. Pat. No. 4,709,157, PEN web having a large width and a continuous length is initially prepared, and coated with the emulsion layer 72, before being slitted into the photo film web 45 by the width of the photo filmstrip 14. The photo film web 45 immediately after the slitting has two lateral edge faces 45a and four corner edges 45b and 45c which are considerably rough with minute recesses, projections, cracks and chips.

In the roll 67, the photo film web 45 is wound to orient the emulsion layer 72 externally. When the remainder of the roll 67 decreases and becomes considerably small, a rear end of the photo film web 45 is connected to another continuity of the photo film web 45 prepared as another roll 67, so that the photo filmstrip 14 is handled in a consecutive manner.

Figure 6:
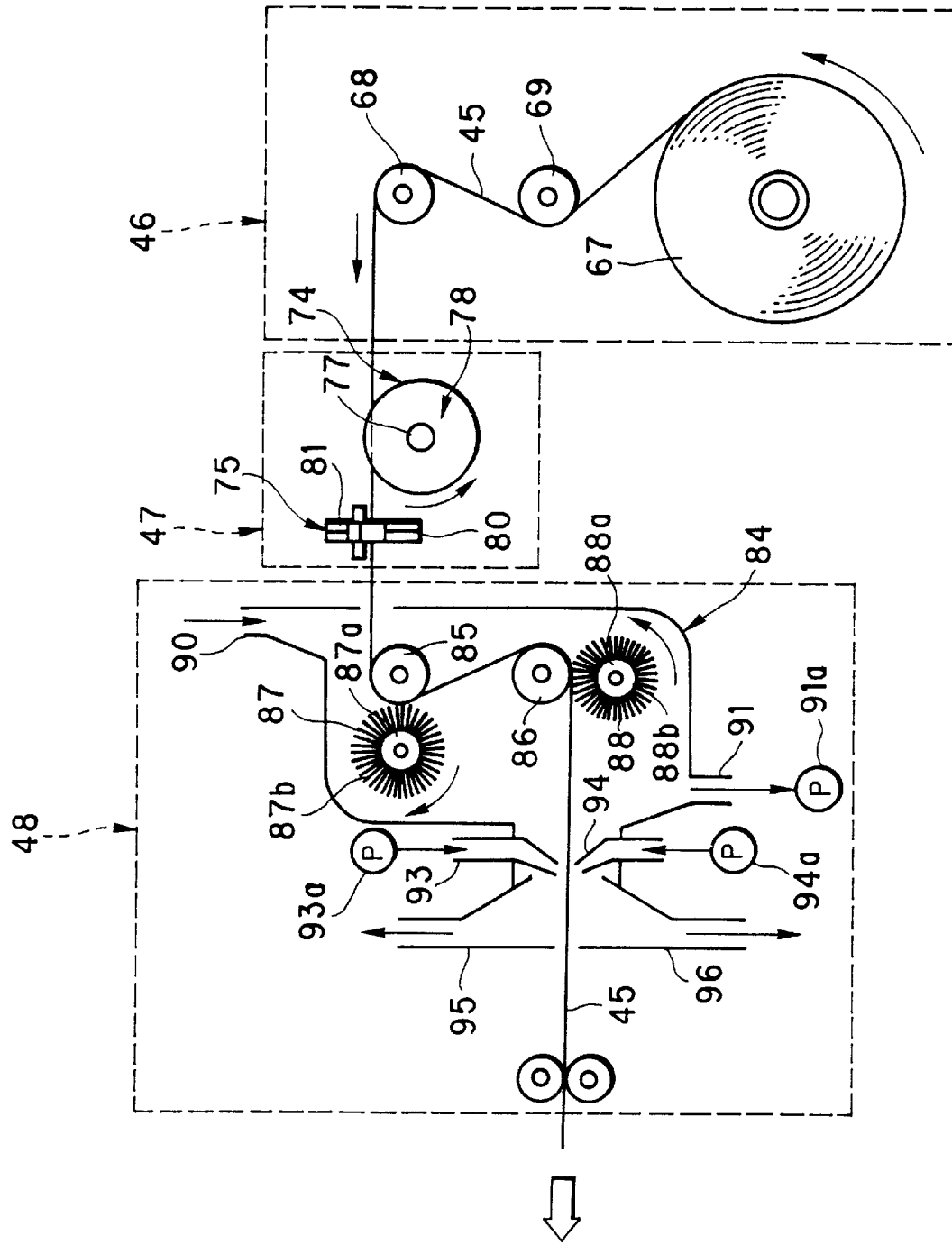
FIG. 6 is an explanatory view illustrating a photo film abrader unit and a cleaning apparatus.

FIG. 6 schematically illustrates the photo film abrader unit 47 and the cleaning apparatus 48. The photo film abrader unit 47 includes an edge face abrader 74 for abrasion of the lateral edge faces 45a, and a corner edge abrader 75 for abrasion of the corner edges 45b on the emulsion layer 72. Note that, in the present invention, the term "abrasion" of the lateral edge faces is used to cover any of abrasion, polishing and sanding. The term "abrasion" of the corner edges is used to cover any manner of chamfering.

Figure 7:
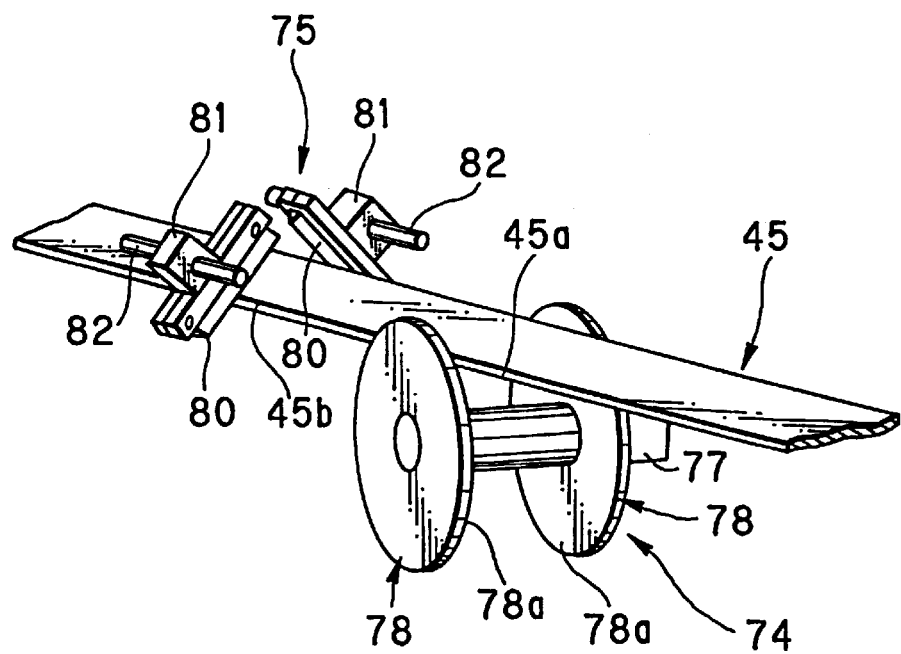
FIG. 7 is a perspective view illustrating the photo film abrader unit.
Figure 8:
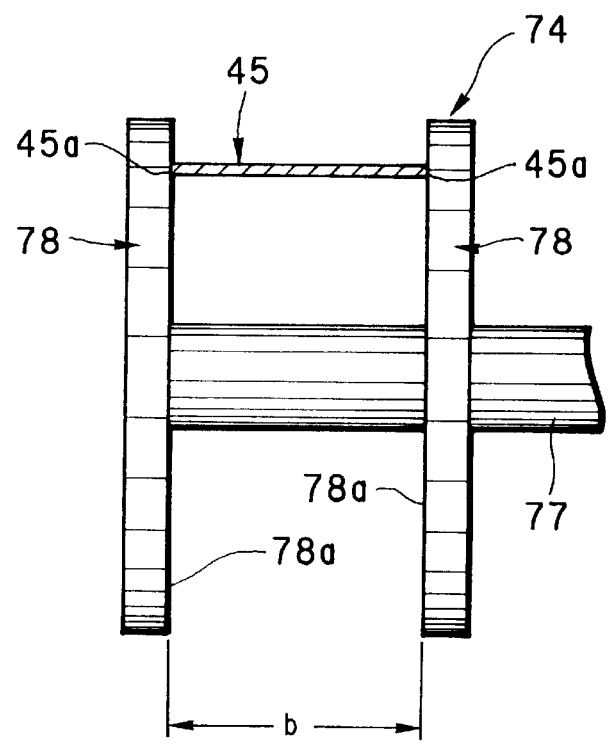
FIG. 8 is a front elevation illustrating an edge face abrader of the photo film abrader unit.

In FIGS. 7 and 8, the edge face abrader 74 includes a shaft 77 and abrasive plates 78. The shaft 77 is connected to a motor (not shown). The abrasive plates 78 are secured to the shaft 77. Abrasive faces 78a of the abrasive plates 78 are contacted on the lateral edge faces 45a of the photo film web 45. The abrasive plates 78 are formed from stainless steel or other hard metal. The abrasive faces 78a are coated with abrasive material or polishing material, including ceramic or industrial diamond. The abrasive plates 78 are rotated by the motor in a direction following the conveyance of the photo film web 45, namely counterclockwise in FIG. 6, to abrade the lateral edge faces 45a of the photo film web 45. An interval b between the abrasive plates 78 is equal to, or slightly smaller than, a width of the photo film web 45, so that the abrasive faces 78a can be contacted on the lateral edge faces 45a without fail.

Note that it is possible to form the abrasive plates 78 from cemented carbides, sapphire, ceramic and other material harder than the photo film web 45 for abrasion of the photo film web 45, instead of coating the abrasive faces 78a of the abrasive plates 78 with the abrasive material or polishing material.

Figure 9:
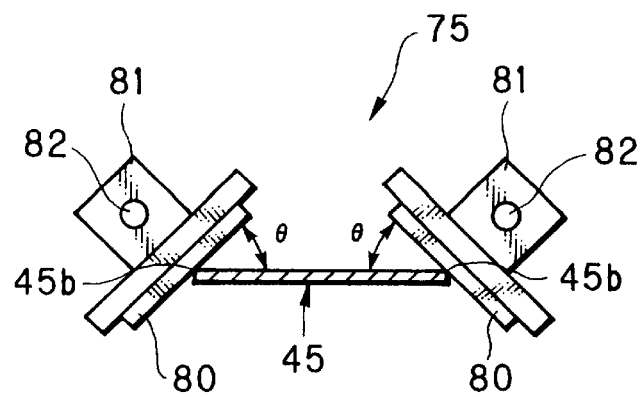
FIG. 9 is a front elevation illustrating a corner edge abrader of the photo film abrader unit.

In FIGS. 7 and 9, the corner edge abrader 75 includes abrader blades 80 or chamfer blades, and blade supports 81. The abrader blades 80 are contacted on the corner edges 45b at a suitable angle. The blade supports 81 respectively support the abrader blades 80. Of course each of the corner edges 45b is associated with one of the abrader blades 80 and one of the blade supports 81. The abrader blades 80 have a wedge shape, and are formed from SKD, SKH, or other alloy tool steel, industrial diamond, sapphire, ruby, or other material harder than the photo film web 45. Each of the blade supports 81 squeezes an associated one of the abrader blades 80 in a manner easily detachable for renewal, and are adjustable in the angle $\theta$ with respect to the photo film web 45 in rotation about one of shafts 82. It is preferable that a blade tip angle, namely tool angle, of the abrader blades 80 is 60 degrees if the abrader blades 80 are formed from industrial diamond, and 15 degrees if the abrader blades 80 are formed from SKD or SKH. It is also preferable that the angle $\theta$ of the abrader blades 80 relative to the photo film web 45 is 30–60 degrees.

Figure 10:
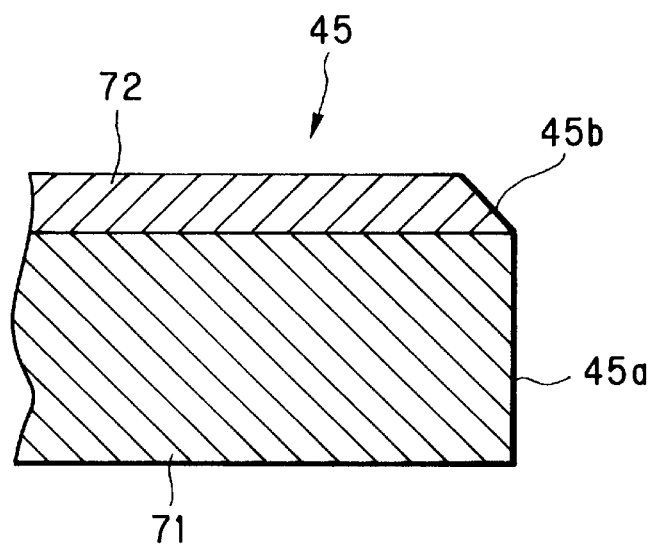
FIG. 10 is a cross section illustrating the photo film web after abrasion.

The photo film web 45 having reached the photo film abrader unit 47 is abraded by the abrasive plates 78 of the edge face abrader 74 and the abrader blades 80 of the corner edge abrader 75 as illustrated in FIG. 10. The lateral edge faces 45a of the photo film support 71 are flattened. The corner edges 45b of the emulsion layer 72 are chamfered at the angle $\theta$ of the abrader blades 80. Therefore it is possible to contact the lateral edges 14c of the photo filmstrip 14 on the disks 19 and 20, and considerably to reduce creation of dust from the photo filmstrip 14.

Figure 11:
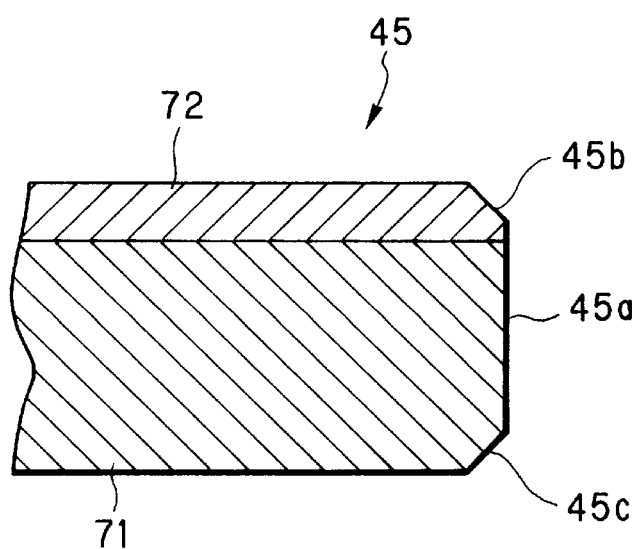
FIG. 11 is a cross section illustrating the photo film web after abrasion according to a variant of the present invention.

Note that the corner edges 45b of the present embodiment are chamfered as deep as a border surface between the emulsion and the support. It is possible as illustrated in FIG. 11 to chamfer the corner edges 45b at a depth short of the border surface between the emulsion and the support. Also the corner edges 45b can be chamfered at a depth beyond the border surface between the emulsion and the support. It is additionally possible to arrange another, lower corner edge abrader in symmetry with the corner edge abrader 75, for chamfering the corner edges 45c located on the photo film support 71, in a form of FIG. 11. The abrader blades 80 are flat, but can be curved and arc-shaped, to chamfer the corner edges 45b with curvature.

The cleaning apparatus 48 has a casing 84, which partially covers the photo film web 45 from the photo film abrader unit 47. The casing 84 is constituted by plates of plastics or metal. In the casing 84, there are arranged conveyor rollers 85 and 86 and brush rollers 87 and 88. The conveyor rollers 85 and 86 convey the photo film web 45. The brush rollers 87 and 88 brush the photo film web 45 to take away photo film dust from the photo film web 45 after creation in the photo film abrader unit 47. The brush rollers 87 and 88 include respective rollers 87a and 88a and respective brushes 87*b* and 88*b*. The rollers 87*a* and 88*a* are rotated by a motor (not shown) and in a direction to follow the conveyance of the photo film web 45. The brushes 87*b* and 88*b* are mounted about the rollers 87*a* and 88*a*. The dust as brushed away is very lightweight, thus flows in the air in the casing 84 and then drops.

There is an intake port 90, disposed through a top of the casing 84, for introducing air. An exhaust port 91 is disposed through a bottom of the casing 84 for exhausting the air. An air pump 91*a* of small pressure is connected to the exhaust port 91, and causes the air in the casing 84 to flow from the intake port 90 to the exhaust port 91. The air in which the photo film dust in the casing 84 is mixed is exited from the casing 84 through the exhaust port 91. It is possible to prevent the dust from sticking again on the photo film web 45 after the brushing of the brush rollers 87 and 88.

Air nozzles 93 and 94 are disposed in a position downstream from the casing 84, for blowing air at a high speed toward the photo film web 45. High-pressure air pumps 93*a* and 94*a* are connected to the air nozzles 93 and 94, and causes them to blow the remainder of the photo film dust away from the photo film web 45, the remainder being stuck even after brushing of the brush rollers 87 and 88. The air with which the dust is mixed is exited from the casing 84 through exhaust ducts or ports 95 and 96, which are disposed down-stream from the air nozzles 93 and 94. The use of the casing 84 has an advantage in avoiding spreading of the dust outside the cleaning apparatus 48 within the strip producing compartment 38. Twofold operation of moving away the dust, first at the brush rollers 87 and 88 and secondly at the air nozzles 93 and 94, is effective in eliminating the dust from the photo film web 45 in a sufficiently high ratio.

Operation of the above embodiment is described now. The PEN web having a large width is initially coated with the emulsion layer 72, and slitted into the photo film web 45 by the width of the photo filmstrip 14. The photo film web 45 is wound again in the form of the roll 67, and set in the photo film web supplier 46 in the strip producing compartment 38. on the photo film web 45 in FIG. 5, the lateral edge faces 45*a* and the corner edges 45*b* and 45*c* are considerably rough with minute recesses, projections, cracks and chips. The photo film web 45 drawn from the roll 67 is conveyed into the photo film abrader unit 47 via the dancer roller 69 by the conveyor roller 68.

The photo film web 45 conveyed in to the photo film abrader unit 47 is abraded by the edge face abrader 74 and the corner edge abrader 75 along the lateral edge faces 45*a* and the corner edges 45*b* as illustrated in FIGS. 6–9. In the edge face abrader 74, the abrasive plates 78 are rotated in the direction following the conveyance of the photo film web 45 while the abrasive faces 78*a* are contacted on the lateral edge faces 45*a*. The abrasive faces 78*a* are coated with the coating of t he abrasive or polishing material including ceramic or industrial diamond, and flatten the lateral edge faces 45*a* of the photo film web 45 as illustrated in FIG. 10.

In the corner edge abrader 75, the abrader blades 80 are contacted on the corner edges 45*b* of the photo film web 45 on the emulsion layer 72 at the angle θ relative to the photo film web 45. The abrader blades 80 have a wedge shape, are harder than the photo film web 45, and chamfer the corner edges 45*b* flatly in FIG. 10.

After the photo film abrader unit 47, the photo film web 45 is conveyed to the cleaning apparatus 48. The photo film web 45 is moved into the casing 84, and brushed by the brush rollers 87 and 88 to remove the dust while conveyed by the conveyor rollers 85 and 86.

The dust brushed away from the photo film web 45 by the brush rollers 87 and 88 is so light that it floats in the air in the casing 84. But the air is caused to flow from the intake port 90 in the top of the casing 84 into the exhaust port 91 in the bottom of the casing 84, and exited from the casing 84 with the dust. The dust brushed away is prevented from being deposited again on the photo film web 45.

Note that it is preferable to connect a dust collecting bag to the air pump 91*a* associated with the exhaust port 91 for the air blow through the casing 84, for the purpose of collecting the dust and avoiding external spread of the dust. This is effective in making it reliable to avoid spreading of the dust outside the cleaning apparatus 48 within the strip producing compartment 38. It is also possible to extend the pipe of the exhaust port 91 to the outside of the strip producing compartment 38.

The photo film web 45 having conveyed past the brush rollers 87 and 88 is conveyed to the air nozzles 93 and 94, through which air blows to the photo film web 45 at a high speed, and moves away the remainder of the dust remaining unbrushed at the brush rollers 87 and 88. The dust moved away is exited from the casing 84 through the exhaust ducts 95 and 96.

A dust collecting bag is connected to the air pumps (not shown) associated with the exhaust ducts 95 and 96. No dust is spread in the strip producing compartment 38. It is also possible to connect hoses to the exhaust ducts 95 and 96, for air exhaustion to the outside of the strip producing compartment 38.

The photo film web 45 having conveyed past the cleaning apparatus 48 is conveyed to the perforator 49, where the perforations 34 are formed in association with the frames 35. The photo film web 45 with the perforations 34 formed therein is conveyed to the cutter 50, where the photo film web 45 is measured for the predetermined length of the photo filmstrip 14, and cut by the cutting mechanism 51. The leader 14*a* and the trailer are formed by the trimming operation of the cutting mechanism 51, to obtain the photo filmstrip 14.

The photo filmstrip 14 is delivered by the delivery unit 53 to the transport paths 40–43, and conveyed to the loaders 57–59. The supply/exit units 63–65 supply the loaders 57–59 with the cassette shell 10 via the transfer rotors 60–62. The trailer of the photo filmstrip 14 is inserted into the cassette shell 10, and retained on the spool core 13. The spool core 13 is rotated to wind the photo filmstrip 14 into the cassette shell 10, before the photo film port shutter 16 is closed. The cassette shell 10 containing the photo filmstrip strip 14 is sent to the supply/exit units 63–65 through the transfer rotors 60–62, and conveyed to the inspecting and packaging stations.

The cassette shell 10 being completely produced is loaded in a camera, which rotates the spool core 13 to advance the photo filmstrip 14 to the outside of the cassette shell 10. The leader 14*a* is contacted on the disks 19 and 20 smoothly without high friction, because the lateral edge faces 45*a* and the corner edges 45*b* are flattened. No dust occurs in contact between the leader 14*a* and the disks 19 and 20. There are no accidents of photographing the photo film dust in the frames 35, or scratching the frames 35. It is possible to lengthen of the camera, the photo film processor, or other external photographer instruments maintenance periods. It was observed from experiments that the photo filmstrip 14 of the present invention was involved only with 15% of dust as compared to the dust from a photo filmstrip similar to the photo filmstrip 14 but not having the lateral edge faces 45*a* or the corner edges 45*b*.

In the above embodiment, the photo film abrader unit 47 has the edge face abrader 74 and the corner edge abrader 75.

It is also possible to use only either one of the edge face abrader 74 and the corner edge abrader 75. It is possible to arrange a plurality of the edge face abraders 74 or the corner edge abraders 75 in a serial manner, for heightening the effect of abrasion. In the cleaning apparatus 48, the brush rollers 87 and 88 and the air stream are used to eliminate photo film dust. It is also possible to wipe the photo film web 45 with non-woven fabric for dust elimination. Dust may be eliminated by any manner of applying pressure or friction to the photo film web 45.

The present invention is applicable to the photo filmstrip 14 having a magnetic recording layer, and to the photo filmstrip 14 of types of the conventional 135 size and 120 size.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. A photo filmstrip producing apparatus for producing a photo filmstrip of a regular length from photo film web having a predetermined width, said photo filmstrip and said photo film web having a back surface, an emulsion surface, a pair of lateral edge faces, and four corner edges defined between said back surface, said emulsion surface, and said lateral edge faces, said photo filmstrip producing apparatus comprising:

a photo film web supplier for supplying said photo film web;

a photo film web abrader for abrading at least one of said lateral edge faces and at least one of said corner edges of said photo film web at a predetermined angle while said photo film web is conveyed;

a cleaning apparatus for eliminating photo film dust from said photo film web, said dust having been created in said abrading of said photo film abrader;

a perforator for forming perforations in said photo film web; and a cutter for cutting said photo film web by said regular length into said photo filmstrip, in order to wind said photo filmstrip into a cassette shell.

2. A photo filmstrip producing apparatus as defined in claim 1, wherein said photofilm web is formed by slitting a web having a width greater than said predetermined width of said photofilm web.

3. A photo filmstrip producing apparatus as defined in claim 1, wherein said photo film abrader includes:

a pair of abrasive plates having respective abrasive faces, said abrasive plates being disposed to confront said abrasive faces with said lateral edge faces of said photo film web, for abrading said lateral edge faces; and an abrader blade device, disposed in an inclination at said predetermined angle relative to said back surface and said emulsion surface of said photo film web, said abrader blade device contacting said at least one corner edge of said photo film web while said photo film web is conveyed, for chamfering said at least one corner edge of said photo film web.

4. A photo filmstrip producing apparatus as defined in claim 3, wherein said predetermined angle is 30–60 degrees.

5. A photo filmstrip producing apparatus as defined in claim 4, wherein said abrasive faces of said abrasive plates contacting said photo film web move in synchronism in a direction following conveyance of said photo film web.

6. A photo filmstrip producing apparatus as defined in claim 5, wherein said abrader blade device chamfers said at least one corner edge of said photo film web located on said emulsion surface.

7. A photo filmstrip producing apparatus as defined in claim 6, wherein said abrader blade device chamfers said at least one corner edge of said photo film web as deep as a border surface between emulsion and photo film support of said photo film web.

8. A photo filmstrip producing apparatus as defined in claim 6, wherein said abrader blade device chamfers said at least one corner edge of said photo film web at a depth short of a border surface between emulsion and photo film support of said photo film web.

9. A photo filmstrip producing apparatus as defined in claim 6, wherein said cleaning apparatus includes:

a casing for partially covering said photo film web while said photo film web is conveyed;

an intake port for letting external air in said casing;

a wiping device, which contacts said photo film web as said photo film web is being conveyed in said casing, said wiping device being operative to remove said dust from said photo film web; and an exhaust port for exhausting said air in said casing and eradicating said dust being removed from said photo film web.

10. A photo filmstrip producing apparatus as defined in claim 9, wherein said cleaning apparatus further includes:

an air nozzle, disposed outside said casing, for blowing said photo film web with air after said photo film web is conveyed out of said casing, to move a remainder of said dust remaining on said photo film web after wiping; and an exhaust port for venting said air with said remainder of said dust being removed from said photo film web.

11. A photo filmstrip producing apparatus as defined in claim 10, wherein said wiping device comprises a rotatable brush roller.

12. A photo filmstrip producing apparatus as defined in claim 9, wherein said wiping device comprises a rotatable non-woven fabric.

13. A photo filmstrip producing apparatus as defined in claim 6, further comprising a second abrader blade device, disposed in inclination at a predetermined angle relative to said back surface and said emulsion surface of said photo film web, said second abrader blade device contacting said at least one of said corner edges of said photo film web located on said back surface while said photo film web is conveyed, for chamfering said at least one corner edge of said photo film web.

* * * * *